United States Patent
Hallewell

[15] 3,683,560
[45] Aug. 15, 1972

[54] FORM COPYING METHOD AND APPARATUS

[72] Inventor: Bernard Fredrick Hallewell, Hillingdon, England

[73] Assignee: Toolmasters Limited, Hillingdon, England

[22] Filed: July 13, 1970

[21] Appl. No.: 54,221

[30] Foreign Application Priority Data

July 15, 1969 Great Britain..........35,667/69

[52] U.S. Cl. ..................................51/100 R, 51/281
[51] Int. Cl. ..............................................B24b 17/02
[58] Field of Search............................51/5, 100, 281

[56] References Cited

UNITED STATES PATENTS

| | | | |
|---|---|---|---|
| 2,477,135 | 7/1949 | Marker | 51/100 |
| 2,956,377 | 10/1960 | White | 51/100 |
| 3,035,565 | 5/1962 | Noble | 51/100 X |

*Primary Examiner*—Harold D. Whitehead
*Attorney*—Woodhams, Blanchard and Flynn

[57] ABSTRACT

Method and apparatus for reproducing in a workpiece the form of a template by moving a rod over the workpiece in unison with the movement of a topped stylus over the template and in which the stylus tip is cast in situ in a mould formed by the tool itself.

12 Claims, 2 Drawing Figures

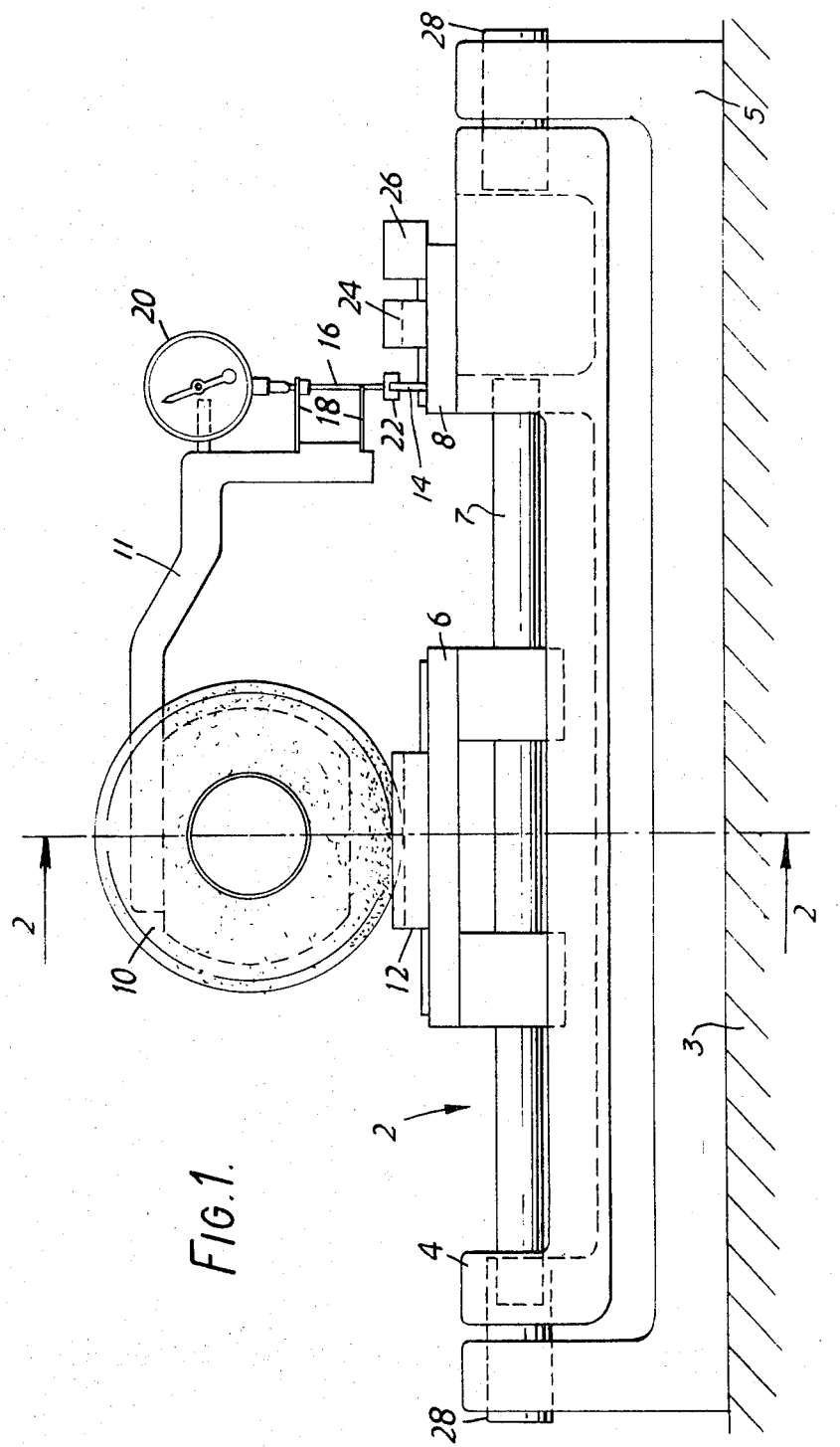

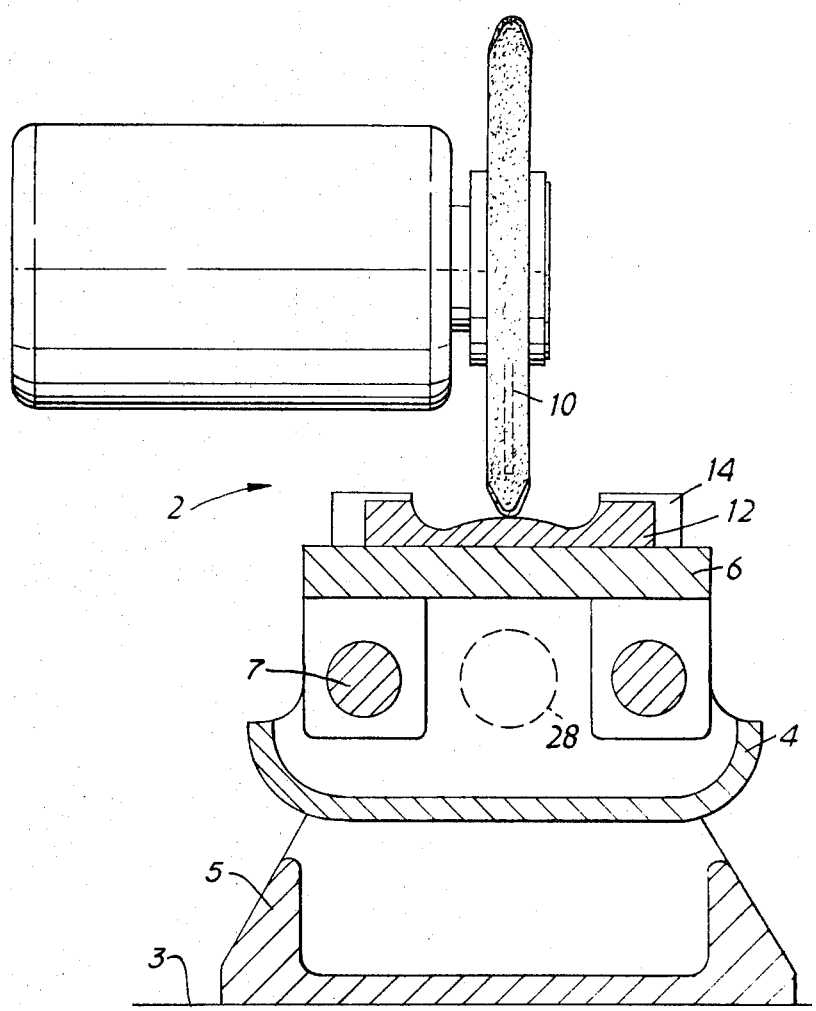

FORM COPYING METHOD AND APPARATUS

This invention relates to a 1/1 form copying device.

In a conventional 1/1 copying arrangement the tool is mounted over the job and a similar size and shape stylus or follower is mounted over a template or master. The tool and stylus are constrained to move together so that if the stylus is made to exactly follow the template then the tool will produce the same shape in the job within the accuracy allowed by the similarity between tool and stylus. During the cutting operation (particularly on a grinding machine) the tool may wear so that the finished accuracy will be limited by variation in tool and stylus sizes.

According to one aspect of the invention correction for tool wear is accomplished by casting or recasting the stylus tip as required in a mould produced by the tool itself. The stylus will then be an exact replica of the tool and if all operations take place upon the machine then the tool and stylus will automatically be in alignment.

In the case of a grinding machine the template, master or piece part to be copied may be affixed to a specially made location area on an attachment mounted on the grinding machine table or ways. This attachment consists of the stationary location table for the template and a work table which is aligned with the template table and able to reciprocate longitudinally on slides so as to always remain aligned with the template table. In operation this work table is caused to reciprocate by hand or any suitable power source (e.g. electric, hydraulic or pneumatic) under the grinding wheel so allowing the work piece to be ground.

When a stylus is to be cast to match the grinding wheel a piece of easily machined material is mounted on the template platform and by movement of the longitudinal slide of the machine is brought under the grinding wheel.

This piece of material then has a slot ground in it exactly matching the grinding wheel profile. By moving only the longitudinal slide of the machine this ground 'mould' is arranged under the stylus so that in the transverse and vertical directions the slot remains aligned with the wheel. A stylus 'tip' is then cast in situ in this slot so as to be attached to the bottom of the stylus arrangement. The casting medium may be any suitable durable and non-distorting hardenable material. An indicator is connected to the stylus to measure its vertical deflection. The reading of this indicator is taken while the stylus tip is still in the mould, and this reading is used as 'zero' in subsequent grinding operations. Grinding operations may then be continued by following the template with the stylus and maintaining the indicator reading at zero by adjusting transverse and vertical machine slides. This procedure of grinding a mould with the wheel and casting a new stylus tip in situ may be repeated as and when required so as to compensate for wheel wear.

In a preferred embodiment provision is made for mounting a profiled dressing block on the template platform or machine wheelhead, the wheel then being readily and quickly re-formed to its required shape by passing it through this block. This is particularly useful where tool wear is considerable, e.g. when using a conventional aluminum oxide or silicon carbide wheel.

Instead of a profiled block, a radius/tangent dresser may be similarly mounted on the template platform or machine wheelhead.

Where the wheel is one which can be readily dressed, and a dresser such as a profiled dressing block or a radius/tangent dresser is provided, it may be preferable to compensate for wheel wear by redressing the wheel and then re-zeroing the initially cast stylus tip in the initially formed mould, rather than by grinding out a new mould with the worn wheel and casting a new stylus tip in this fresh mould; in this procedure the redressed wheel of course corresponds exactly in profile to the original wheel and hence to the initially cast stylus tip, and remains in alignment with the latter, so that recasting of the tip in a mould ground by the redressed wheel is generally not necessary, re-zeroing of the tip being adequate.

The stylus is preferably supported by spaced flexible spring steel strips. This arrangement is ideal for this purpose having no friction or susceptibility to wear, but allowing the required degree of vertical movement together with maximum transverse stability.

The attachment carrying the work table and template table is preferably mounted on trunnions so that the work table and template table assembly may be swung about a longitudinal center line. This allows for more favorable grinding approach to some work pieces, allowing the face of the grinding wheel to be used rather than the sides. This produces a better grinding condition and also limits inaccuracies in copying due to side deflections of the wheel or stylus. This pivotal mounting of the work table and template assembly is of similar advantage with conventional form copiers in which no provision is made for recasting the stylus tip in situ in a mould ground by the wheel.

The copying arrangement described is also suitable for automatic copying using any of the established means by coupling the stylus to the control system sensor and allowing the control system to activate the machine vertical feed.

In another application of the invention, the reciprocating work table described above is replaced by a rotary workhead mounted to permit cylindrical work to be copy machined.

The invention, particularly applicable to grinding machines, but also applicable to a variety of other machine tools thus provides a form copying method and apparatus in which a tool moves in unison with the movement of a stylus over a template to reproduce the template form on a workpiece and in which the stylus tip is cast or recast as necessary in situ in a mould formed by the tool itself. The invention also provides a carriage for attachment to such apparatus and carrying the work table and template platform, and means for mounting the mould blank on the template platform. There is also provided form copying apparatus in which a tool moves in unison with the movement of a stylus over a template to reproduce the template form on a workpiece, the workpiece table and template platform being mounted so that they can be swung about a longitudinal center axis to permit optimum approach of the tool to the workpiece.

An embodiment of the invention is illustrated in the accompanying drawings in which FIG. 1 is a side elevation, partly in section, showing diagrammatically parts of a grinding machine, and FIG. 2 is an end elevation, in section, along lines 2—2 of FIG. 1.

In the drawings a portion of a conventional surface grinding machine is indicated generally at 2, the machine table 3 having a support 5 fixedly mounted thereon, which in turn has pivotally mounted thereon a carriage 4 carrying a worktable 6 and a template platform 8. The worktable 6 is slidably supported on the guide rods 7. A rotatable grinding wheel 10 is supported over the carriage 4 on a support member 11 for grinding a workpiece 12. The table 3, as is conventional with surface grinders, is movably mounted on the machine frame by means of a cross-slide for permitting the table to move longitudinally and transversely under the grinding wheel, and the grinding wheel is likewise mounted so as to be movable toward and away from the table to permit the grinding wheel to be moved into engagement with the workpiece mounted on the table. These movements of the grinding wheel and of the worktable are conventional with surface grinders, as disclosed in U. S. Pat. No. 3,324,493 The template platform carries a template 14 whose form is to be copied, and a stylus 16 which is moved over the template surface. The stylus is mounted on two spaced flexible steel spring strips 18 which permit vertical movement of the stylus as it rides over the template the springs 18 in turn being mounted on the support member 11. The grinding operation is conducted in the conventional manner; the vertical deflection of the stylus is shown on an indicator dial 20, and the reading on this dial is maintained constant while the wheel and stylus are constrained to relatively move together over the workpiece and template respectively so that the wheel produces on the workpiece a profile corresponding to that of the template. Normally tool wear limits the accuracy of profile reproduction, but this is overcome according to the invention by employing a stylus tip 22 which is cast in situ to correspond exactly to the profile of the wheel. A block 24 of easily ground material, e.g. easily ground metal, is mounted on the template platform in alignment with the grinding wheel and by movement of the longitudinal slide (not shown) of the machine is brought under the wheel 10, which then cuts in the block 24 a slot corresponding exactly to its own profile. By movement of the longitudinal slide the resulting mould is then brought under the stylus and the tip 22 is then cast in the mould and on the end of the stylus, using any suitable casting material, e.g. a hard wax. The stylus tip thus cast is an exact replica of the wheel. The reading on the indicator dial is taken as the zero for subsequent grinding, this reading being maintained constant as the template is brought under and into contact with the stylus tip and during the grinding of the workpiece. The stylus tip is removed and a fresh one cast (using of course a freshly formed mould in each case) as often as is necessary according to tool wear e.g. before or even during a grinding operation. In the embodiment illustrated the template platform also carries a diamond profiled dressing block 26; when wheel wear has become excessive the wheel is readily re-formed to the required profile by passing it through the dressing block, this operation being followed by re-zeroing the existing stylus tip in the existing mould or by casting a fresh stylus tip in a fresh mould as described above.

The carriage 4 is mounted on trunnions 28, permitting the workpiece and template thereon to be swung in unison about the longitudinal trunnion axis. This permits the most advantageous angle of attack of the wheel to the workpiece to be maintained; i.e. the whole carriage, with workpiece and template, can be pivoted relative to the wheel and stylus so that inclined surfaces of the profile can be ground with the periphery rather than with the sides of the wheel, the template adopting the same orientation relative to the stylus. As indicated above, this feature of pivotal mounting of the carriage is equally of advantage with conventional form-copying equipment.

In a further embodiment of the invention the reciprocating table described above is replaced by a rotary workhead, whose axis of rotation lies across the carriage 4, so allowing cylindrical work to be copy machined.

I claim:

1. In a form copying method in which a tool is constrained to move over a workpiece in unison with the movement of a tipped stylus over a template to reproduce the template form on the workpiece, the improvement which comprises casting or recasting the stylus tip in a mould formed by the tool itself.

2. In a method according to claim 1 the further improvement of effecting the formation of the mould by the tool and the casting of the stylus tip on the same machine as the form copying operation so that tool and stylus are in alignment.

3. In a method according to claim 1 wherein the tool is a grinding wheel on a surface grinding machine, the template is mounted on the grinding machine on a template table and the workpiece is mounted on the grinding machine on a worktable, said worktable being reciprocable in alignment with the template table, the improvement of casting said stylus tip by mounting a block of machinable material on the template platform, bringing said block under the grinding wheel and grinding therein a slot matching exactly the grinding wheel profile thereby forming a mould for the stylus tip, bringing this mould under the stylus with the slot in precise alignment with the grinding wheel, and casting in the slot a stylus tip attached to the stylus, whereby the stylus tip is a replica of the grinding wheel profile and is in precise alignment with the grinding wheel.

4. In a method according to claim 3 wherein an indicator is connected to the stylus and measures its vertical deflection, the improvement of taking the reading of the indicator while the cast stylus tip is still in the mould and maintaining this reading of the indicator as the stylus tip follows the template in subsequent grinding operations.

5. In a method according to claim 3 the further improvement of grinding a fresh mould and casting a new stylus tip in said new mould when said wheel becomes worn, thereby to compensate for wheel wear.

6. In a method according to claim 4 the improvement which comprises mounting a dresser on the machine and compensating for wheel wear by re-forming the worn wheel to its original profile with the dresser, disposing the initially cast stylus in the initially formed mould and adjusting the vertical deflection until the indicator gives the said reading.

7. In a method according to claim 3 the improvement of mounting the worktable and template table on an attachment mounted on trunnions whereby said tables can be swung in unison about a longitudinal center line, and swinging the tables about this line during the form copying operation to maintain an optimum orientation of the workpiece to the grinding wheel.

8. In a surface grinding machine having a rotatable grinding wheel mounted over and relatively movable toward and away from a machine table provided with transverse slides and with means for selectivity and controlledly moving the machine table on said slides relative to said wheel, the improvement which comprises:
a template platform mounted fixedly relative to the machine table;
a worktable mounted below the grinding wheel for reciprocation longitudinally of the machine relative to the grinding wheel, template table and machine table;
a stylus mounted resiliently above the template table for vertical movement relative to the grinding wheel, template table and machine table;
means for mounting on said template table a moulding block in register with said grinding wheel; and
means for registering vertical deflection of the stylus relative to the grinding wheel;
whereby said moulding block can have a slot formed therein by said grinding wheel, with a tip for said stylus then being formed in said moulding block so that said stylus is identical to said grinding wheel.

9. A machine according to claim 8 wherein the stylus is supported by spaced flexible spring strips.

10. A machine according to claim 8 including an indicator connected to the stylus for measuring the vertical deflection of the stylus.

11. A machine according to claim 8, wherein said worktable for the workpiece and the template platform are mounted on trunnions for pivotal movement together about an axis extending longitudinally of the machine table.

12. An attachment for a form copying machine which comprises a base member attachable to the machine table of the copying machine, a template table mounted on the member and a worktable mounted on the member for reciprocation relative to the template table, the worktable and template table each being mounted for pivotal movement in unison about an axis parallel to the direction of reciprocation of the worktable.

* * * * *